US011361393B1

(12) United States Patent
Kangkoban et al.

(10) Patent No.: US 11,361,393 B1
(45) Date of Patent: Jun. 14, 2022

(54) VENUE MANAGEMENT SYSTEM AND VENUE TRACKING APPLICATIONS

(71) Applicants: Raj Kangkoban, Hicksville, NY (US); Melissa Sage, Mason, OH (US)

(72) Inventors: Raj Kangkoban, Hicksville, NY (US); Melissa Sage, Mason, OH (US)

(*) Notice: Subject to any disclaimer, the term of this patent is extended or adjusted under 35 U.S.C. 154(b) by 148 days.

(21) Appl. No.: 16/706,479

(22) Filed: Dec. 6, 2019

Related U.S. Application Data

(62) Division of application No. 15/417,637, filed on Jan. 27, 2017, now abandoned.

(60) Provisional application No. 62/287,540, filed on Jan. 27, 2016.

(51) Int. Cl.

| | |
|---|---|
| *G06Q 50/12* | (2012.01) |
| *G01C 21/36* | (2006.01) |
| *G06Q 30/02* | (2012.01) |
| *G01C 21/34* | (2006.01) |
| *G06Q 30/06* | (2012.01) |

(52) U.S. Cl.
CPC ......... *G06Q 50/12* (2013.01); *G01C 21/3415* (2013.01); *G01C 21/3605* (2013.01); *G01C 21/3697* (2013.01); *G06Q 30/0281* (2013.01); *G06Q 30/0635* (2013.01)

(58) Field of Classification Search
CPC .............. G06Q 50/12; G06Q 30/0635; G06Q 30/0281; G01C 21/3605; G01C 21/3415; G01C 21/3697
See application file for complete search history.

(56) References Cited

U.S. PATENT DOCUMENTS

| | | | | |
|---|---|---|---|---|
| 5,912,743 | A * | 6/1999 | Kinebuchi | G06Q 10/087 358/442 |
| 6,920,431 | B2 * | 7/2005 | Showghi | H04L 7/0012 705/15 |
| 7,174,308 | B2 * | 2/2007 | Bergman | G06Q 20/04 705/27.1 |
| 8,682,729 | B2 | 3/2014 | Werbitt | |
| 8,750,784 | B2 * | 6/2014 | Ortiz | H04N 21/41407 455/3.01 |

(Continued)

FOREIGN PATENT DOCUMENTS

| | | | |
|---|---|---|---|
| WO | WO-0182187 A1 * | 11/2001 | ............. G06Q 10/08 |
| WO | WO2004028177 | 4/2004 | |
| WO | WO2012054778 | 4/2012 | |

OTHER PUBLICATIONS

Adrianne Pasquarelli. "Your Order Is on Its Way; Venture-Capital-Backed Boom in Food Delivery Is Giving New Yorkers More Options Than Ever. But Is More Actually Better?" Crain's New York business 31.36 (2015): 4-. Print. (Year: 2015).*

(Continued)

*Primary Examiner* — Ashford S Hayles
(74) *Attorney, Agent, or Firm* — Goldstein Law Offices, P.C.

(57) ABSTRACT

Embodiments are directed toward a network-based venue management system comprising a venue management server and one or more location sensors coupled to a network. The sensors are arranged to detect the location of a customer within a venue, as the customer travels within the venue. The venue management server is arranged to receive location information from the sensors and to track the customer, providing real-time geo-location information to the customer and to venue staff.

13 Claims, 8 Drawing Sheets

(56) References Cited

U.S. PATENT DOCUMENTS

| | | | |
|---|---|---|---|
| 9,204,251 B1* | 12/2015 | Mendelson | G06Q 20/327 |
| 9,204,257 B1* | 12/2015 | Mendelson | G06Q 30/0261 |
| 9,230,292 B2* | 1/2016 | Amin | G06Q 30/0641 |
| 9,373,091 B1* | 6/2016 | Belser | G06Q 20/00 |
| 9,420,423 B1* | 8/2016 | Mendelson | H04W 4/80 |
| 9,600,946 B1* | 3/2017 | Gerace | G07C 9/28 |
| 9,665,903 B2* | 5/2017 | Glazer | A47F 10/00 |
| 9,830,625 B2* | 11/2017 | Proietti | G06Q 30/0601 |
| 10,068,272 B1* | 9/2018 | Varma | G06Q 30/0635 |
| 2002/0038259 A1* | 3/2002 | Bergman | G07F 7/00 |
| | | | 705/27.1 |
| 2003/0050854 A1* | 3/2003 | Showghi | G06Q 10/02 |
| | | | 705/15 |
| 2007/0018952 A1* | 1/2007 | Arseneau | H04H 40/27 |
| | | | 345/156 |
| 2007/0038503 A1* | 2/2007 | Krajcev | G06Q 30/0281 |
| | | | 705/301 |
| 2008/0040753 A1* | 2/2008 | Anandpura | H04N 21/6581 |
| | | | 725/60 |
| 2010/0121689 A1* | 5/2010 | Wallace | G06Q 20/12 |
| | | | 705/14.1 |
| 2011/0090123 A1* | 4/2011 | Sridhara | G01S 5/0252 |
| | | | 342/450 |
| 2011/0093302 A1* | 4/2011 | Hernandez | G06Q 10/02 |
| | | | 705/5 |
| 2011/0173041 A1* | 7/2011 | Breitenbach | G06Q 30/0277 |
| | | | 705/7.13 |
| 2011/0270662 A1* | 11/2011 | Rocco | G06Q 50/12 |
| | | | 705/14.27 |
| 2012/0059729 A1* | 3/2012 | Roa | G06Q 30/02 |
| | | | 705/26.1 |
| 2012/0101900 A1* | 4/2012 | Milatz | G06Q 30/0277 |
| | | | 705/14.55 |
| 2012/0242492 A1* | 9/2012 | Grunfeld | G08B 21/24 |
| | | | 340/667 |
| 2013/0185102 A1* | 7/2013 | Grossi | G06Q 20/20 |
| | | | 705/5 |
| 2013/0197981 A1* | 8/2013 | Vendetti | H04W 4/33 |
| | | | 705/14.5 |
| 2013/0268899 A1* | 10/2013 | Valentino | G06Q 10/02 |
| | | | 715/852 |
| 2014/0046802 A1* | 2/2014 | Hosein | G06Q 30/06 |
| | | | 705/26.61 |
| 2014/0114807 A1* | 4/2014 | Baker | G06Q 30/0617 |
| | | | 705/26.41 |
| 2014/0274125 A1* | 9/2014 | Sendonaris | G01S 5/02 |
| | | | 455/456.1 |
| 2014/0274153 A1* | 9/2014 | Greco | H04W 4/21 |
| | | | 455/456.3 |
| 2015/0057025 A1* | 2/2015 | Malik | H04W 4/023 |
| | | | 455/456.3 |
| 2015/0081532 A1 | 3/2015 | Lewis et al. | |
| 2015/0177006 A1* | 6/2015 | Schulz | G01C 21/3407 |
| | | | 701/537 |
| 2015/0178817 A1* | 6/2015 | Fein | G06Q 30/0252 |
| | | | 705/26.81 |
| 2015/0201305 A1* | 7/2015 | Edge | H04W 4/02 |
| | | | 455/456.3 |
| 2015/0241238 A1* | 8/2015 | Bass | G01C 21/3641 |
| | | | 701/434 |
| 2015/0262085 A1* | 9/2015 | Mader | G06Q 10/02 |
| | | | 705/5 |
| 2015/0302347 A1* | 10/2015 | Fredette | G06Q 10/083 |
| | | | 705/15 |
| 2015/0334676 A1* | 11/2015 | Hart | H04W 64/003 |
| | | | 455/456.1 |
| 2015/0356501 A1* | 12/2015 | Gorjestani | G06Q 10/0833 |
| | | | 705/333 |
| 2015/0356664 A1* | 12/2015 | Mackler | G06Q 30/0635 |
| | | | 705/26.81 |
| 2016/0093005 A1* | 3/2016 | Cornhill | G06Q 30/0633 |
| | | | 705/14.64 |
| 2016/0110781 A1* | 4/2016 | Bedel | H04W 4/02 |
| | | | 705/5 |
| 2016/0125466 A1* | 5/2016 | Kulkarni | G06F 3/04842 |
| | | | 705/14.58 |
| 2016/0125514 A1* | 5/2016 | Plattenburg | H04W 4/029 |
| | | | 705/26.9 |
| 2016/0127899 A1* | 5/2016 | Jabara | H04W 4/80 |
| | | | 455/411 |
| 2016/0300389 A1* | 10/2016 | Glenn, III | G01C 21/206 |
| 2016/0323708 A1* | 11/2016 | Sahadi | H04W 4/023 |
| 2017/0006434 A1* | 1/2017 | Howe | H04W 4/021 |
| 2017/0011319 A1* | 1/2017 | Elliot | G06Q 50/12 |
| 2017/0089709 A1* | 3/2017 | Marusco | G01C 21/206 |
| 2017/0372551 A1* | 12/2017 | Bruce | G06Q 10/02 |

OTHER PUBLICATIONS

"High-Tech Food Delivery System a Hit at Roger Dean Stadium Spring Training Games." The Palm Beach post (1984) 2013: n. pag. Print. (Year: 2013).*

Kelly Barbieri. "Year in Review 2000: Innovations: In-Seat Food Delivery Catching on at Stadiums Across the Country." Amusement business 112.51 (2000): 77-. Print. (Year: 2000).*

Schwartz, John. "Hey, Getcha Cellphone! At Stadiums, Dial a Hot Dog." The New York times 2002: C4-. Print. (Year: 2002).*

By Carl Bialik. "Dial Me Some Peanuts and Cracker Jack—Ballparks Let Fans Order Food From Seats via Cellphone; Press 11 for Chicken Wings." The Wall Street journal. Eastern edition 2003: n. pag. Print. (Year: 2003).*

John, Geraint, Rod Sheard, and Ben Vickery. "Food and Beverage Catering." Stadia. Routledge, 2013. 195-206. Web. (Year: 2013).*

Brandau, M. (2007). Scoring big in the dining game. Nation's Restaurant News, 41(5), 66-67. Retrieved from https://www.proquest.com/trade-journals/scoring-big-dining-game/docview/229308001/se-2?accountid=14753 (Year: 2007).*

Buzalka, M. (2015). In-seat pizza delivery for all fans at all star game. Food Management, Retrieved from https://www.proquest.com/trade-journals/seat-pizza-delivery-all-fans-at-star-game/docview/1692915253/se-2?accountid=14753 (Year: 2015).*

* cited by examiner

VENUE MANAGEMENT SYSTEM AND VENUE TRACKING APPLICATIONS

CROSS REFERENCES AND RELATED APPLICATIONS

This application claims priority to Provisional Patent Application Ser. No. 62/287,540, filed in the United States Patent Office on Jan. 27, 2016, and is a divisional application of U.S. patent application Ser. No. 15/417,637, filed in the United States Patent Office on Jan. 27, 2017. These related applications are incorporated by reference herein in their entirety.

BACKGROUND

Large venues such as arenas, convention centers and theaters can host hundreds, thousands, and even tens of thousands of customers when holding events, such as sports events, concerts, comic conventions, plays, movies and so on. Vendors at the venue commonly employ staff to serve commodities and offer services to customers such as food and beverages, and other paraphernalia. Sometimes waitstaff venture out into the venue to directly serve customers in the arena. Because such venues are often large, however, and vast numbers of customers are often moving about the venue and may be changing location, it is difficult for staff to serve them efficiently. Thus, customers who would like to order commodities such as food and beverages must either make their way to vendors, or must wait for staff to come to them at specific locations. As a result, customers often must wait long times for orders and cannot move about as they would like. Further, waitstaff or other venue service personnel can have a difficult time finding and correctly delivering orders to customers when there are so many customers or the venue is large. Also, large venues are bewildering to navigate, even for repeat customers, staff, and service providers.

BRIEF SUMMARY

The present disclosure describes embodiments of a venue management system configured to provide enhanced ordering of services and robust tracking of customers and venue service staff at a venue such as a large arena. The venue management system includes a database for the venue, defining a grid of locations within the venue. Sensors are distributed throughout the venue and mapped to the grid in a plurality of zones. The mapped grid and sensors can be employed to locate customers and venue service staff using tracking applications on client computers such as smart phones or tablet computers.

The system also comprises a venue tracking application for a client computer configured to interface with the location sensors and track the location of the client computer. In this regard, the venue tracking application includes a sensor tool configured to interface with the location sensors distributed throughout a venue and generate a local geo-fence or location tag for a user client device. A mapping tool can track and guide the user to various venue locations. Venue tracking applications are configured to coordinate order delivery to customers by venue service staff.

In an embodiment, the venue tracking application is a customer application, and includes an order interface for ordering products or services available at the venue. The customer application also includes a notification tool configured to activate a notification that an ordered product or service is available at a location proximate to the customer's location, for example, when waitstaff has arrived with a food or beverage order. The notification tool can also be configured to provide a color-coded visual identifier to the display of the customer's portable computer, for example smartphone or tablet, to identify the customer to venue service staff.

In an embodiment, the tracking application is a venue service application. The venue service application includes a dispatch tool configured to track a customer, determine a tracked location of the customer, and dispatch a venue service staff to the tracked location of the customer. A notifier tool is configured to generate and send a color-coded notification to one or more customer applications, wherein an interface of the venue service client computer including the venue server application identifies one or more customers by unique colors, which are also displayed on the customer computers including the customer applications.

The venue management system provides numerous advantages to customers, venue service providers, and vendors, such as: enhanced ordering and supply tracking, efficiently identifying the closest pick-up locations for both customers and venue service staff, easily changing pickup locations and delivery locations for customer orders, and guiding users to specific locations in the venue such as seats, gates, restrooms and nursing locations. The venue management system can also provide greater efficiency in employing user tracking and mapping to manage traffic flow through the venue. The venue management system can also provide emergency services. For example, the venue management system can notify users of an emergency situation and use location tracking and mapping to direct and help evacuate users to safe locations.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION OF THE EMBODIMENTS

Figure 1:
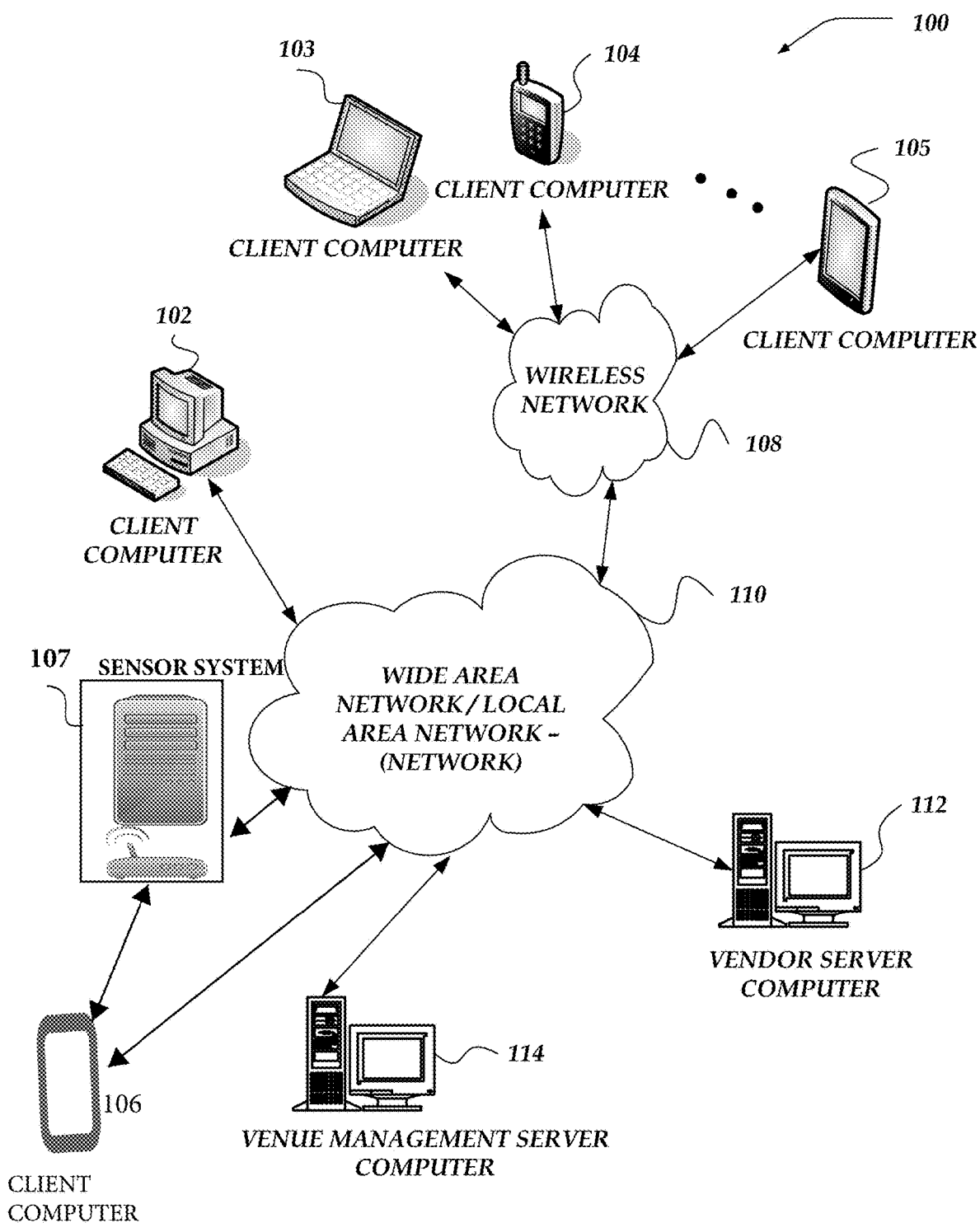
FIG. 1 is a system diagram of an environment in which at least one of the various embodiments of a venue management system may be implemented.

Various embodiments now will be described more fully hereinafter with reference to the accompanying drawings, which form a part hereof, and which show, by way of illustration, specific embodiments by which the invention may be practiced. The embodiments may, however, be embodied in many different forms and should not be construed as limited to the embodiments set forth herein. Rather, these embodiments are provided so that this disclosure will be thorough and complete, and will fully convey the scope of the embodiments to those skilled in the art. Among other things, the various embodiments may be methods, systems, media, or devices. Accordingly, the various embodiments may take the form of an entirely hardware embodiment, an entirely software embodiment, or an embodiment combining software and hardware aspects. The following detailed description is, therefore, not to be taken in a limiting sense.

Throughout the specification and claims, the following terms take the meanings explicitly associated herein, unless the context clearly dictates otherwise. The term "herein" refers to the specification, claims, and drawings associated with the current application. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

In various embodiments, described herein is a system and method for venue management, tracking customers and venue service providers, and providing venue services and accommodations to customers. Although the term customer is used throughout, it will be understood that the user is broadly understood to be the person or persons associated with a customer application at a venue, and that tracking of customers refer to tracking of devices including the customer application. Similarly, although the term venue service staff is used throughout, it will be understood that the user is broadly understood to be the person or persons providing services for a venue or venue customers, waiters, arena staff, suppliers, emergency personnel, etc., regardless of whether employed by or an agent of a venue owner or managing entity. Finally, although venue tracking applications are described for customers and venue service providers, venue tracking applications can be configured for any user, and are not limited to customers or venue service providers.

FIG. 1 shows components of one embodiment of an environment in which embodiments of the innovations described herein may be practiced. Not all of the components may be required to practice the innovations, and variations in the arrangement and type of the components may be made without departing from the spirit or scope of the innovations. As shown, system 100 of FIG. 1 includes local area networks (LANs)/wide area networks (WANs) including network 110 and wireless network 108, client computers 102-106, vendor server computer 112, venue management server computer 114, and sensor system 107 configured to interact with a client computer tracking application 101b such as a customer application or venue service application as described herein. The environment is described in more detail below in conjunction with FIGS. 2-3.

Figure 4A:
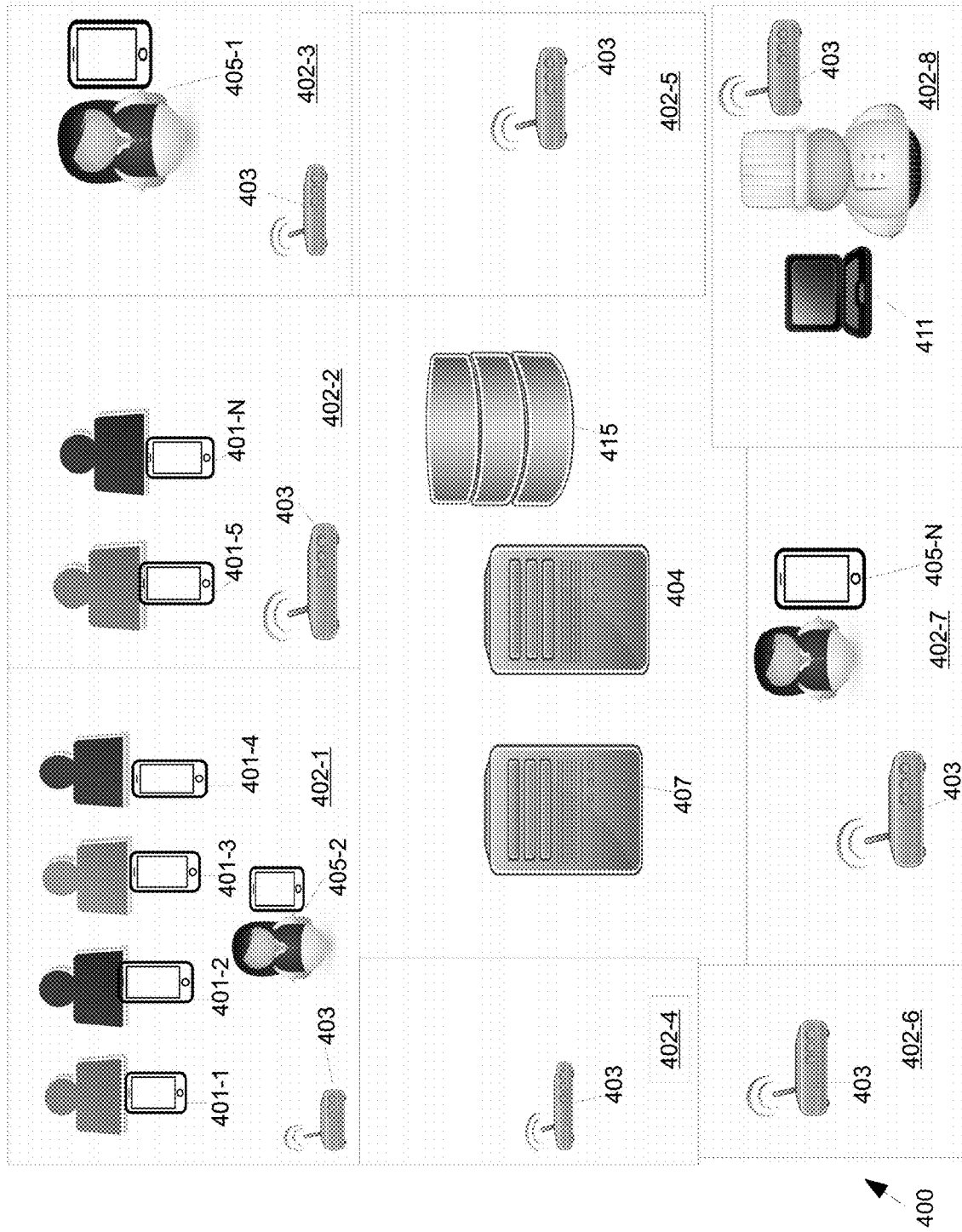
FIGS. 4A-4C illustrates an architecture of a system in accordance with at least one of the various embodiments.

FIG. 4A illustrates an exemplary architecture for a venue location system 400. As will be appreciated, the illustrative architecture has been simplified to show a limited number of elements (e.g., customers, venue service staff, zones, and sensors) for purposes of easy understanding. The use of the term "N" refers to any number. In at least one of the various embodiments, customer applications on a customer client computer, for example a smart phone or tablet computer, are uniquely associated with a customer user 401-1, 401-2 . . . 401-N. Each customer user 401-1, 401-2 . . . 401-N has a ticket for the venue and has a client computer, such as a portable computer device (e.g. smart phone, tablet, etc.), which can be in communication with the sensor 403 by using a sensor tool. Each customer application is configured to send and receive data from a sensor device 403.

In at least one of the various embodiments, venue service staff 405-1, 405-2 . . . 405-N has a client computer, such as a portable computer device (e.g. smart phone, tablet, etc.), running a venue service application and in communication with the sensor 403. Each venue service application is configured to send and receive data from a sensor device 403 using a sensor tool. Sensors 403 are distributed throughout the venue to provide substantial coverage for tracking and service delivery as described herein. Each sensor 403 is correlated with a zone 402-1 . . . 402-N in the venue, which is mapped in a database 415 (stored at the venue management server computer 114, for instance). Although only one sensor 403 per zone 402-1 . . . 402-N is shown, a zone may have one or more sensors 403. As will be appreciated, the illustrative architecture has been simplified for purposes of easy understanding.

In an embodiment, a controller (not shown) can connect, communicate, and manage one or more sensor devices 403, obtain and aggregate raw sensor event data, filter out unnecessary data, and send the data to at least one sensor server 407, which can act as an intermediary or interface between the controller devices and other server(s) 404 database(s) 415, and client computers 411 within the venue location system 400. For example, in at least one of the various embodiments, an onsite server 407 can process data and translate it into meaningful location tracking events. The location tracking events can be sent to one or more venue management servers 402 of the venue management system 400, as well as other devices such as the client computer 411 and databases 415. In an embodiment, the controllers and servers can be connected via a network, such as a bus network, for example a message bus, although other wired or wireless networks or LAN/WAN network connections as described herein can be employed in any combination as known in the art.

One of ordinary skill in the art will appreciate that the architecture of system 400 is a non-limiting example that is illustrative of at least a portion of at least one of the various embodiments. As such, more or less components may be employed and/or arranged differently without departing from the scope of the innovations described herein.

In at least one of the various embodiments, location events from one or more customer applications may be determined. The system is configured to associate a customer entity with a ticket for the venue, assign at least one unique identifier to the customer, which is provided to the customer, and associate the customer (and/or customer number) with at least one user account for a user application. The customer application can include other information about the customer and/or customer account as well. In at least one of the various embodiments, events can be managed by a venue management server 404, such as, venue management server computer 114, vendor server computer 112, network computer 300, or the like. During the venue tracking process various types of information can be tracked in conjunction with location events, for example entry points into departments, routes through the area, items viewed, and visit duration.

In at least one of the various embodiments, location tracking events that are received and/or determined by one or more customers' applications 401-1, 401-2 . . . 401-N communicating with the sensors 403 are processed in the venue management system 400. For example, when a customer with the customer application 401-1, 401-2 . . . 401-N is in a sensor zone 402-1 . . . 402-N, the customer client computer is tracked, and the tracking data can be correlated with other data, for example exits, seats, servers, or vendors mapped to or correlated with that zone.

For example, a venue management server 404 can include a communication component (such as network interface component 236, or the like, described below). The communication component is communicatively coupled to the processor 202, and is arranged to communicate real-time geo-location information to one or more vendor devices and one or more customer devices, based on the physical location of the customer within the venue. The geo-location information can include the physical location of a person, object, site, attraction, vendor, etc., within the venue, or directions or similar information regarding the spatial arrangement of sites and/or persons within the venue, or the like.

The operation of certain aspects of the invention will now be described with respect to FIGS. 4A-C and 6. In at least one of the various embodiments, processes described in conjunction with FIGS. 4A-C and 6, may be implemented by and/or executed on various combinations of network computers, client computers, virtual machines, or the like as described in conjunction with FIGS. 1-5.

Figure 6:
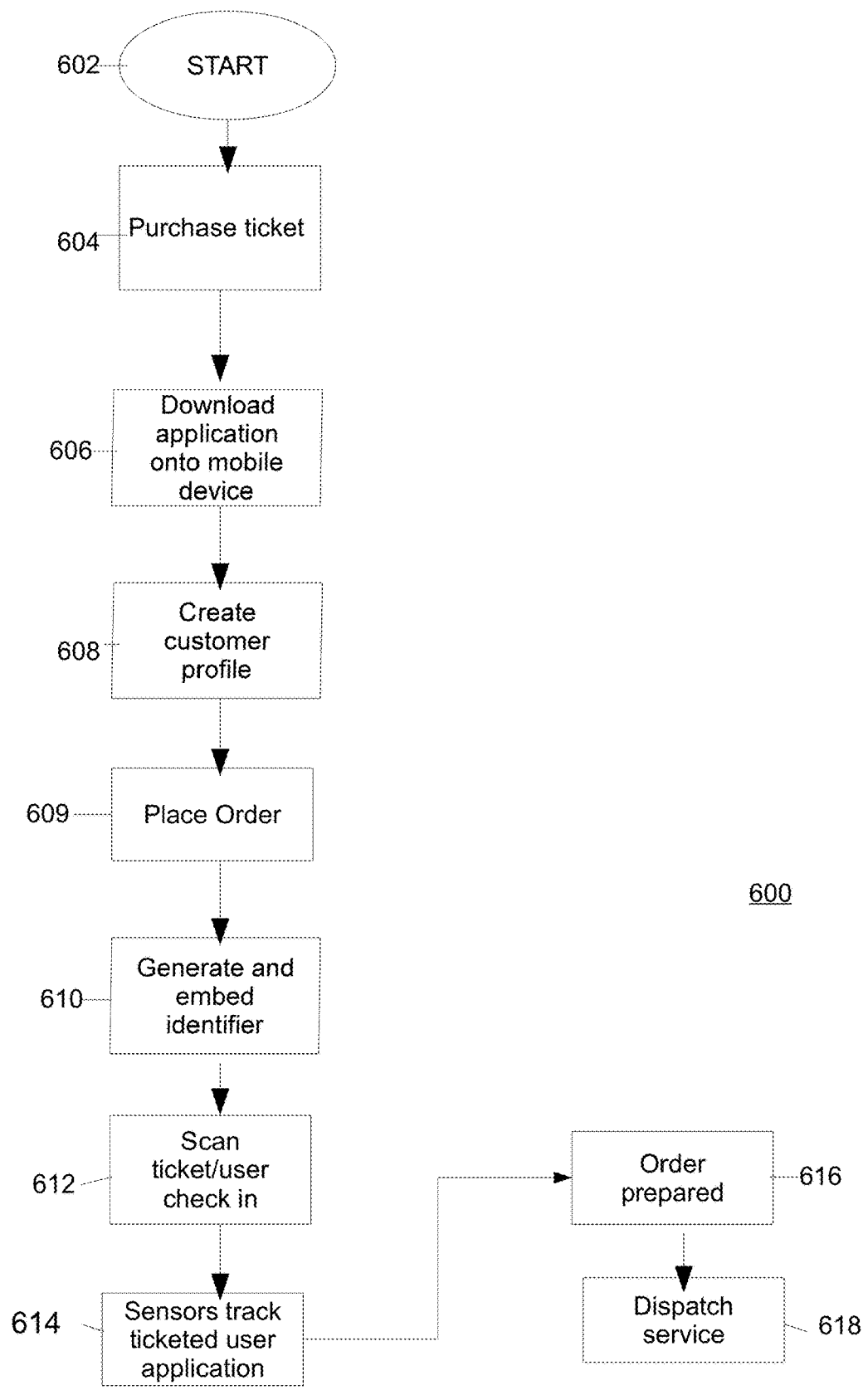
FIG. 6 illustrates an exemplary process flow for a venue management system in accordance with at least one of the various embodiments.

FIG. 6 illustrates an overview flowchart of process 600 in accordance with at least one of the various embodiments. After a start block at block 602, in at least one of the various embodiments, at block 604, a customer buys a ticket for an event at a venue, for example a sports event at an arena, or a play at a theater. At block 606, the customer downloads a customer application. In particular, the customer might be provided the opportunity to download the application when purchasing the ticket or any time thereafter. For example, a download link may be provided on a website while purchasing the ticket. The opportunity to download the customer application may also be provided in an email to the customer. For example, when the customer is emailed a ticket receipt, that email may include a hyperlink to a web server hosting the customer application. At block 608 the customer is also prompted to create a user profile and register with the venue management system. The customer profile can include security and identification data to appropriately identify the customer when at the venue before providing services. Such security and identification data may include a pin number to confirm orders, credit card information, an image of the customer's driver's license or other proof of age and identity as described herein. The customer application includes an order tool, where the customer can pre-order commodities or services prior to arriving at the venue location as shown at block 609 or any time thereafter.

At block 609, the venue management system receives an order for goods or services, where the order is associated with the customer account. The order may include the unique identifier, for instance, or another associative piece of information from the user's customer account or profile. The order may be confirmed based on the use of security information attached to the order, such as the user's pin, a password, or the like. The order is received from the customer application, via the order tool, for example, which can include a user interface portion for entering security information. In some cases, the order may comprise a ticket order for attendance at an event at the venue.

At block 610, the system generates a customer identifier linked to the purchased ticket order to uniquely identify and link the customer application to the ticket for the venue, for example embedding a name, telephone number or an email address on the ticket. The customer identifier can be embedded or printed on the ticket, for example in a barcode.

At block 612, when the customer reaches the venue, the ticket is scanned. Accordingly, upon entering the venue, the venue identifies the customer and the application initiates customer tracking. In at least one of the various embodiments, the user logs in to the customer application and inputs a seat number, if the information is not already inputted or scanned in or otherwise correlated with the customer identifier.

Figure 4B:
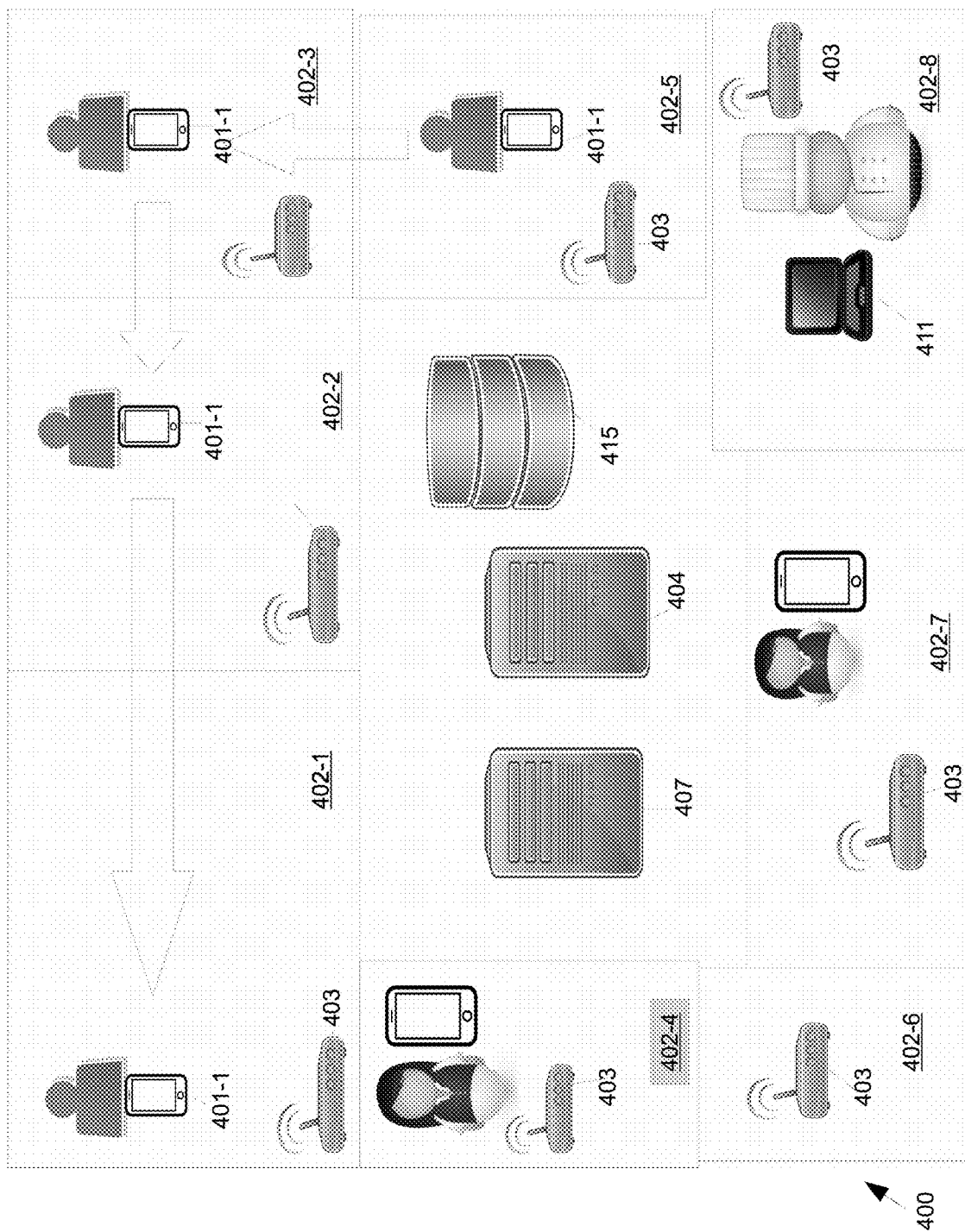

At block 614, the application synchronizes with the location sensors to guide the customer to his or her seat. For example, as shown in FIG. 4B, when the customer enters the venue, a sensor 403 in an entrance/exit zone 402-5 communicates with the customer application sensor tool configured to interface with the location sensor 403 and a mapping tool generates a local geofence or tracking tag for the customer. The sensor 403 communicates with the venue management server 404 as described herein to synchronize the customer's 401-1 sensed location with a map grid correlated in the database 415 the zones 402-1 . . . 402-N, and guides the customer through the venue, generating directions through contiguous zones 402-3, 402-2, 402-1 to the set of the customer 401-1 in zone 402-1. As sensors 403 continue to track the customer 401-1 as he or she moves through the venue, the mapping tool of the customer application will redirect the customer 401-1 as needed if the customer does not go directly to his or her seat. For example, the sensor tool can communicate with sensors 403 distributed throughout the venue to track and provide the mapping tool with real time directions to direct the customer to any location, such as to a vendor, a bathroom, a nursing station, a gate, exits and entrances, a parking lot, etc.

Figure 4C:
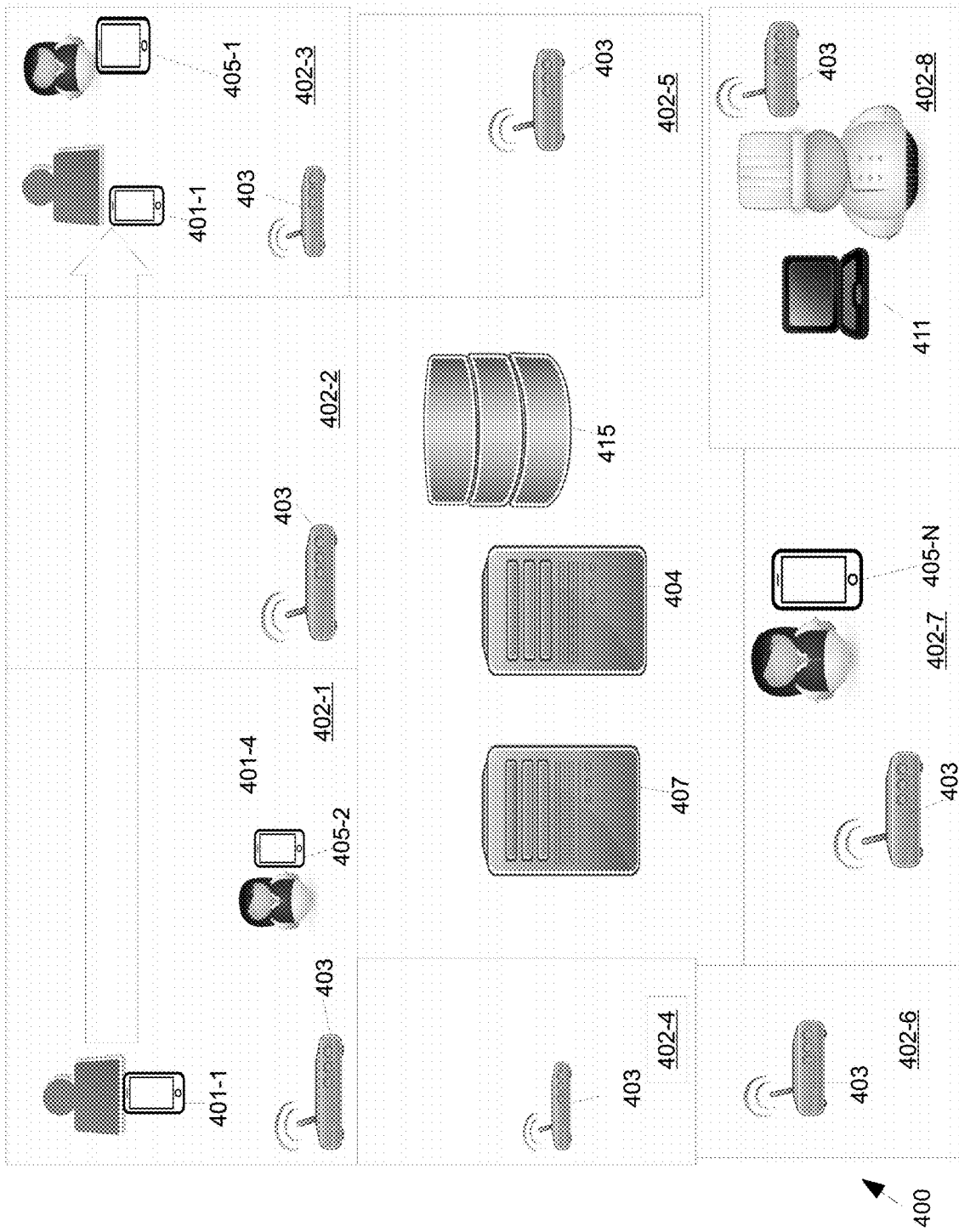

In at least one of the various embodiments, as noted above, the customer can use an ordering tool to order products or services available at the venue from any location. The customer can place the order prior to arriving at the venue as described above (for example when purchasing the ticket or when en route, upon arrival, or while at the venue). With reference to FIGS. 4A-4C, using the example of a food vendor for venues such as a theater or arena, a customer 401-1 may place an order for a beverage and food prior to arriving at the venue as shown at block 609. At block 612, the customer 401-1 checks into the venue. In an embodiment, at block 616 once the customer has arrived at the venue, the system tracks the customer's location using the sensor, and the appropriate order is prepared. For example, in an embodiment, if the customer has previously given seat or location information, the system can track the customer application via the sensors and determine if the customer has reached his or her seat zone. If so, the order is prepared and automatically sent, or the user can be prompted through the customer application and asked if he or she wants the order at that moment. However, with the configuration of features described herein, the venue management system does not need to have customer seat information to deliver the order to the customer.

At block 618, after the order is prepared, the system includes a dispatch tool to dispatch the closest or most efficiently located venue service staff 405-1, 405-2 . . . 401-N to the customer to deliver the order. In an embodiment, when the customer 401-1 checks into the arena at block 612, the customer application can prompt the customer 401-1 if he or she would prefer to pick up the order at the vendor location in zone 402-8 or at his or her seat. If the customer 401-1 chooses to pick up the order, the system directs the customer 401-1 from any zone 402-3, 402-2, 402-1 to the vendor location in zone 402-8 using the customer application mapping tool and sensor tracking as described above.

If, in the alternative, the customer 401-1 chooses to have the food and beverage order delivered to his or her seat, since the venue management system can track the customer 401-1 to any location in the grid, the system does not require the customer's seat assignment, if any, to offer delivery of the beverage and food order directly to the customer. For example, when an order is ready, the dispatch tool notifies the venue service staff 405-2 who is serving or closest to zone 402-1 where customer 401-1 is located as determined by the sensor 403 in zone 402-1. If, however, the customer 401-1 moves or changes seats to a different zone 402-3, for example to sit at a bar or with a friend from a chance meeting, as shown in FIG. 4C, the dispatch tool can reroute the waitstaff 405-2 using the mapping tool, or dispatch closer venue staff 405-1 to the different zone 402-3 to deliver the order of the customer 405-1 to the new location. In an embodiment, when the system tracking determines that the customer has changed locations, the customer receives a prompt via the customer application asking if he or she would like the order rerouted to the new location, or would they prefer to pick up the order at another location in the venue. If the customer selects rerouting the order, in at least one of the various embodiments, the venue service application dispatch tool is configured to display the customer order and location in zone 402-3 to the closest or most available venue service staff 405-1, and a venue service application sensor tool and mapping tool guides the waitstaff to the customer. If the user does not want the order rerouted, the order delivery can be postponed until the system tracking determines that the customer has returned to his or her seat.

In an embodiment, the customer application includes a notification tool configured to activate a notification on the customer's client computer indicating that an ordered product or service is available near the customer's location. In an embodiment, the notification tool is configured to provide a color-coded visual identifier to the display of the customer's client computer to identify the identity of the customer to venue service staff 405-2. In an embodiment, the venue service application includes a notifier tool configured to generate and send a color-coded notification to one or more customer applications, wherein an interface of the venue service device including the venue service application identifies one or more of the customers each by unique color. Corresponding colors are displayed on the customer devices having the customer applications, such as by flashing the screen of the customer device in the unique color, using the notification tool.

Referring to FIG. 4A, again using the example of a food vendor for a venue, customers 401-1, 401-2, 401-3, 401-4, all of whom are in the same zone 402-1, each place an order for a beverage and food. The customer application notifies each customer on his or her device that his or her order is on the way. Such notification may include an approximate time of arrival. When the waitstaff with the prepared order is in the same zone as the tracked customer, the waitstaff uses the notifier tool of the venue service application to indicate that he or she has arrived with the customers' orders. For instance, in an embodiment, the waitstaff selects the name or order information for each consumer on the venue service application using the notifier tool. The venue service application then assigns each customer a unique color. Upon the waitstaff's arrival in the relevant zone 402-1, the notification tool of the customer application displays a highly visible indication on the customer's client computer display, for example, a blinking colored screen, in the unique color, with a logo in center. In an embodiment, other notifications can be activated on the customer's client computer; for example, the client computer can vibrate, including unique pulses, or play sounds or music. The customer can then hold his or her client computer up to show to the waitstaff to confirm that they are delivering the order to the correct customer. As multiple customers are ordering in the same zone 402-1, for example in the same row of a theater or arena, each customer application is assigned their own unique color using the notifier tool on the venue service device as described above. The waitstaff's venue service application can then display the matching assigned color along with each customer's name and/or other order information on the venue service staff's client computer. As each customer's device screen will flash the same color as that which is coded on the waiter's screen, visual confirmation is made, and the food and beverages for each order can be properly delivered or passed down to each customer. In an embodiment, a customer can also input a confirmation in the customer application to verify receipt of the order, for example a 4 digit pin created by the customer as part of a registration process as described above.

In at least one of the various embodiments, the system can be configured to verify the age or identity of a customer, for example to vend alcoholic beverages. In an embodiment, a customer who wishes to consume alcohol at the venue uploads his/her identification card or license to a user profile database in the venue management server when creating their customer profile or otherwise registering to use the customer application as described above. A vendor's client computer 411 and the venue service application can then display the license or identification on a vendor client computer 411 when the order is placed, and staff can verify the customer's license/identification picture is the actual customer upon delivery of the order using the venue service application.

At various points the customer tracking events mapped to the venue management system grid database are associated with one or more location services, for example, zone entry and exit, proximity to merchants or vendors, mapping and directions to specific services or vendors, venue entry and exit points, routes through the area, and visit duration. In an embodiment, the sensors track the customer application and information is provided to the venue management system based on the matched locations from the venue and the tracked client computer. Information can be provided by, for example, the venue management server computer 114 or other systems or servers, for example a vendor server computer 112 for a vendor at the venue. The venue management system could provide, for example, real time advertising based on location such as vendor offers and proximity to product or service offers. In an embodiment, the order tool can be used to order venue services, for example, to purchase tickets for upcoming events or request special services (onscreen birthday, anniversary, proposals, etc.). The customer application can also be configured to provide and display links or data streams relevant to the venue, for example sports scores when the ticketed event is a sports game at an arena, or details regarding upcoming events.

In an embodiment, the venue management system can be configured to provide mapping and directions to customer applications and venue service applications to assist emergency situations. For example, the application can include tools to direct customers to first aid stations or exits in an emergency. In an embodiment, the venue management server computer 114 can be configured to provide directions to customer applications and venue service applications to control or manage flow through the venue, for example by sending zone-by-zone entry instructions or exit/evacuation instructions to sensed devices and providing real-time directions to venue staff and customers. In an embodiment, the venue management system can be configured to notify users of an emergency situation, and then mapping and/or dispatch tools can be employed to direct and help evacuate customers and staff to a safe location. In addition, the customer and venue service applications can be configured to provide other tools to assist in emergency situations, for example, tools to summon emergency personnel.

Illustrative Operating Environment

Returning to FIG. 1, in one embodiment, at least some of client computers 102-105 may operate over a wired and/or wireless network, such as networks 110 and/or 108. Generally, client computers 102-106 may include virtually any computer capable of communicating over a network to send and receive information, perform various online activities, offline actions, or the like. It should be recognized that more or less client computers can be employed in a system such as described herein, and embodiments are therefore not constrained by the number or type of client computers employed. At least one embodiment of client computers 102-106 are described in more detail below in conjunction with FIG. 2

Computers that may operate as client computers may include computers that typically connect using a wired or wireless communications medium such as personal computers, multiprocessor systems, microprocessor-based or programmable electronic devices, network PCs, or the like. In some embodiments, client computers 102-106 may include virtually any portable personal computer capable of connecting to another computing device and receiving information such as, laptop computer 103, smart mobile telephone 104, 106 and tablet computers 105, and the like. Other portable devices such as cellular telephones, display pagers, radio frequency (RF) devices, infrared (IR) devices, Personal Digital Assistants (PDAs), handheld computers, wearable computers, integrated devices combining one or more of the preceding devices, and the like may serve as the portable computer described herein. As such, client computers 102-106 may have a wide range of capabilities and features. Moreover, client computers 102-106 may be configured to access various computing applications, including a browser, or other web-based application.

A web-enabled client computer may include a browser application that is configured to receive and to send web pages, web-based messages, and the like. The browser application may be configured to receive and display graphics, text, multimedia, and the like, employing virtually any web-based language, including Wireless Application Protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), and the like, to display and send a message. In one embodiment, a user of the client computer may employ the browser application to perform various activities over a network (online). However, another application may also be used to perform various online activities.

Client computers 102-106 may also include at least one other client application that is configured to receive and/or send content between it and another computer. The client application may include a capability to send and/or receive content, or the like. The client application may further provide information that identifies itself, including a type, capability, name, and the like. In one embodiment, client computers 102-106 may uniquely identify themselves through any of a variety of mechanisms, including an Internet Protocol (IP) address, a phone number, Mobile Identification Number (MIN), an electronic serial number (ESN), or other device identifier. Such information may be provided in a network packet, or the like, sent between other client computers, vendor server computer 112, venue management server computer 114, sensor server computer, or other computers.

Client computers 102-106 may further be configured to include a client application that enables an end-user to log into an end-user account that may be managed by another computer, such as vendor server computer 112, venue management server computer 114, or the like. Such end-user account, in one non-limiting example, may be configured to enable the end-user to manage one or more online activities, including in one non-limiting example, search activities, social networking activities, browse various websites, communicate with other users, or the like. However, participation in such online activities may also be performed without logging into the end-user account.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) and 5th (5G) generation radio access for cellular systems, WLAN, Wireless Router (WR) mesh, and the like. Access technologies such as 2G, 3G, 4G, 5G, and future access networks may enable wide area coverage for mobile devices. In one non-limiting example, wireless network 108 may enable a radio connection through a radio network access such as Global System for Mobil communication (GSM), General Packet Radio Services (GPRS), Enhanced Data GSM Environment (EDGE), Code Division Multiple Access (CDMA), Time Division Multiple Access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, and the like.

Network 110 is configured to couple network computers with other computers and/or computing devices, including, vendor server computer 112, venue management server computer 114, client computer 102, sensor system 107 and client computers 102-106 through wireless network 108. Network 110 is enabled to employ any form of computer readable media for communicating information from one electronic device to another. Also, network 110 can include the Internet in addition to Local Area Networks (LANs), Wide Area Networks (WANs), direct connections, such as through a Universal Serial Bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communication links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP). In essence, network 110 includes any communication method by which information may travel between computing devices.

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of vendor server computer 112 is described in more detail below in conjunction with FIG. 3. Briefly, however, vendor server computer 112 can include virtually any network computer capable of providing, inter alia, vendor services in conjunction with venue management and tracking as described herein. Computers that may be arranged to operate as vendor server computer 112 include various network computers, including, but not limited to personal computers, desktop computers, multiprocessor systems, microprocessor-based or programmable consumer electronics, network PCs, server computers, network appliances, and the like.

Although FIG. 1 illustrates vendor server computer 112 as a single computer, the invention is not so limited. For example, one or more functions of the vendor server computer 112 may be distributed across one or more distinct network computers. Moreover, vendor server computer 112 is not limited to a particular configuration. Thus, in one embodiment, vendor server computer 112 may contain a plurality of network computers. In another embodiment, vendor server computer 112 may contain a plurality of network computers that operate using a master/slave approach, where one of the plurality of network computers of vendor server computer 112 is operative to manage and/or otherwise coordinate operations of the other network computers. In other embodiments, the vendor server computer 112 may operate as a plurality of network computers arranged in a cluster architecture, a peer-to-peer architecture, and/or even within a cloud architecture. Thus, the invention is not to be construed as being limited to a single environment, and other configurations, and architectures are also envisaged.

One embodiment of venue management server computer 114 is described in more detail below in conjunction with FIG. 3. Briefly, however, venue management server computer 114 includes virtually any network computer capable of, inter alia, venue management, application tracking, customer identification, order management, and serving application and application tools as described herein. Computers that may be arranged to operate as venue management server computer 114 include various network computers, including, but not limited to personal computers, desktop computers, multiprocessor systems, microprocessor-based or programmable consumer electronics, network PCs, server computers, network appliances, and the like.

While venue management server computer 114 is shown as a single computer, the various embodiments are not so limited. For example, one or more functions of the venue management server computer 114 may be distributed across one or more distinct network computers. Moreover, venue management server computer 114 is not limited to a particular configuration. Thus, in one embodiment, venue management server computer 114 may contain a plurality of network computers. In another embodiment, venue management server computer 114 may contain a plurality of network computers that operate using a master/slave approach, where one of the plurality of network computers of venue management server computer 114 operates to manage and/or otherwise coordinate operations of the other network computers. In other embodiments, the venue management server computer 114 may operate as a plurality of network computers within a cluster architecture, a peer-to-peer architecture, and/or even within a cloud architecture. Thus, the invention is not to be construed as being limited to a single environment, and other configurations, and architectures are also envisaged.

Although illustrated separately, vendor server computer 112, venue management server computer 114 may be employed as a single network computer, separate network computers, a cluster of network computers, or the like. For example, venue management server computer 114 can be hosted by vendor server computer 112 or vice-versa. In some embodiments, any or all of vendor server computer 112, venue management server computer 114 may be enabled to track client computers, deliver content, perform mapping, respond to user interactions with the content, track user interaction with the content, update widgets and widgets controllers, and perform the application management as described herein.

Illustrative Client Computer

Figure 2:
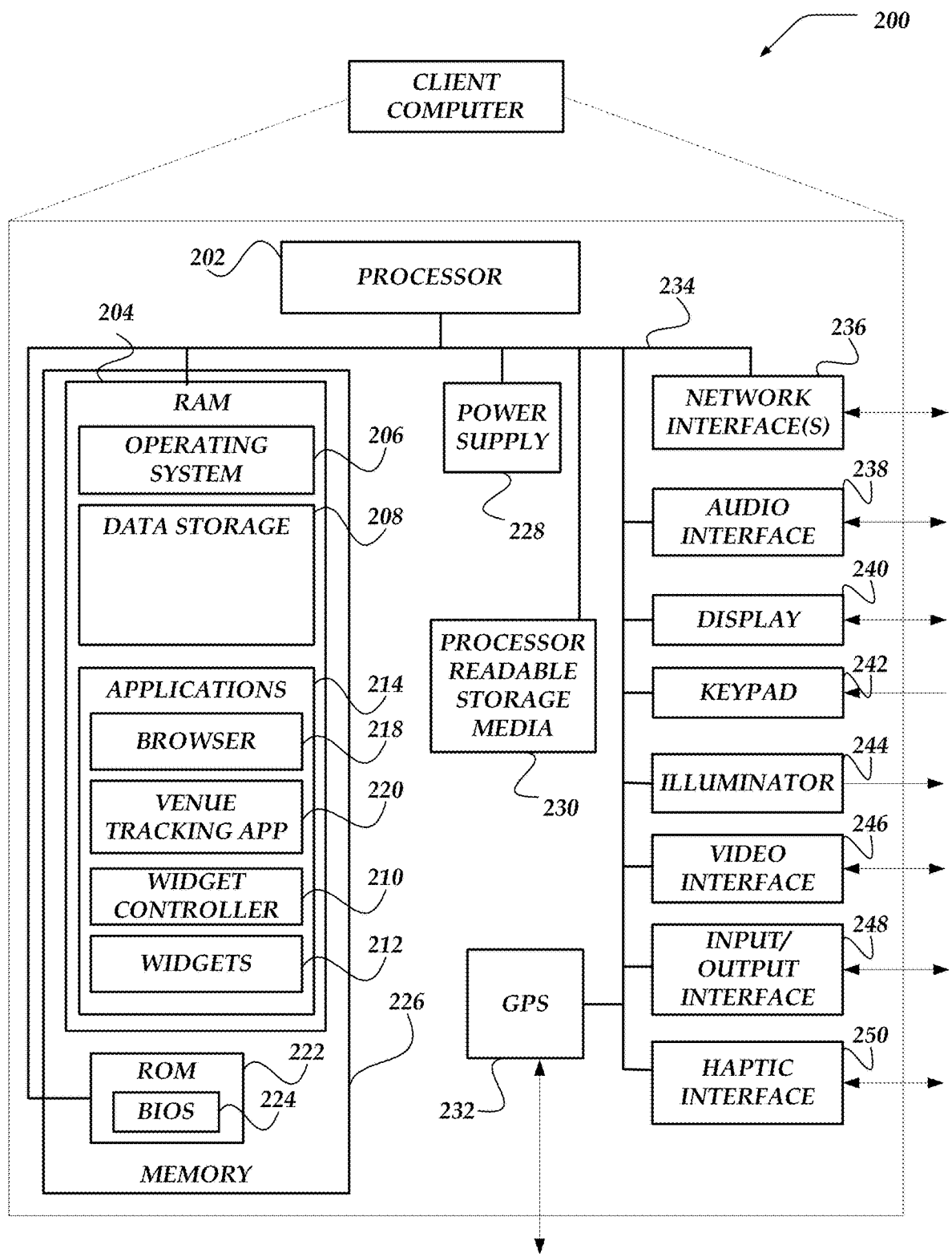
FIG. 2 shows an embodiment of a client computer that may be included in a venue management system such as that shown in FIG. 1 and FIGS. 4A-5C.

FIG. 2 shows one embodiment of client computer 200 that may be included in a system implementing embodiments of the invention. Client computer 200 may include many more or less components than those shown in FIG. 2. However, the components shown are sufficient to disclose an illustrative embodiment for practicing the present invention. Client computer 200 may represent, for example, one embodiment of at least one of client computers 102-106 of FIG. 1.

As shown in the FIG. 2, client computer 200 includes a processor 202 in communication with a mass memory 226 via a bus 234. In some embodiments, processor 202 may include one or more central processing units (CPU). Client computer 200 also includes a power supply 228, one or more network interfaces 236, an audio interface 238, a display 240, a keypad 242, an illuminator 244, a video interface 246, an input/output interface 248, a haptic interface 250, and a global positioning system (GPS) receiver 232.

Power supply 228 provides power to client computer 200. A rechargeable or non-rechargeable battery may be used to provide power. The power may also be provided by an external power source, such as an alternating current (AC) adapter or a powered docking cradle that supplements and/or recharges a battery.

Client computer 200 may optionally communicate with a base station (not shown), or directly with another computer. Network interface 236 includes circuitry for coupling client computer 200 to one or more networks, and is constructed for use with one or more communication protocols and technologies including, but not limited to, GSM, CDMA, TDMA, GPRS, EDGE, WCDMA, HSDPA, LTE, User Datagram Protocol (UDP), Transmission Control Protocol/Internet protocol (TCP/IP), Short Message Service (SMS), WAP, Ultra Wide Band (UWB), IEEE 802.16 Worldwide Interoperability for Microwave Access (WiMax), Session Initiated Protocol/Real-time Transport Protocol (SIP/RTP), or any of a variety of other wireless communication protocols. Network interface 236 is sometimes known as a transceiver, transceiving device, or network interface card (NIC). Network interface 236 can also be employed to interface with sensors as described herein.

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be a liquid crystal display (LCD), gas plasma, Light Emitting Diode (LED), organic LED, or any other type of display used with a computer. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Illuminator 244 may provide a status indication and/or provide light. Illuminator 244 may remain active for specific periods of time or in response to events. For example, when illuminator 244 is active, it may backlight the buttons on keypad 242 and stay on while the client computer is powered. Also, illuminator 244 may backlight these buttons in various patterns when particular actions are performed, such as dialing another client computer. Illuminator 244 may also cause light sources positioned within a transparent or translucent case of the client computer to illuminate in response to actions.

Video interface 246 is arranged to capture video images, such as a still photo, a video segment, an infrared video, or the like. For example, video interface 246 may be coupled to a digital video camera, a web-camera, or the like. Video interface 246 may comprise a lens, an image sensor, and other electronics. Image sensors may include a complementary metal-oxide-semiconductor (CMOS) integrated circuit, charge-coupled device (CCD), or any other integrated circuit for sensing light.

Client computer 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like. Input/output interface 248 can also be employed to interface with and act as a transceiver for sensors as described herein.

Haptic interface 250 is arranged to provide tactile feedback to a user of the client computer. For example, the haptic interface 250 may be employed to vibrate client computer 200 in a particular way when another user of a computing computer is calling. In some embodiments, haptic interface 250 may be optional.

Client computer 200 may also include GPS transceiver 232 to determine the physical coordinates of client computer 200 on the surface of the Earth. GPS transceiver 232, in some embodiments, may be optional. GPS transceiver 232 typically outputs a location as latitude and longitude values. However, GPS transceiver 232 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 232 can determine a physical location within millimeters for client computer 200; and in other cases, the determined physical location may be less precise, such as within a meter or significantly greater distances. In one embodiment, however, client computer 200 provides other information that may be employed to determine a physical location of the computer, including for example, a Media Access Control (MAC) address, IP address, or the like. As will be appreciated, in embodiments, location tracking can be used in conjunction with sensor tracking as described herein.

Mass memory 226 includes a Random Access Memory (RAM) 204, a Read-only Memory (ROM) 222, and other storage means. Mass memory 226 illustrates an example of computer readable storage media (devices) for storage of information such as computer readable instructions, data structures, program modules or other data. Mass memory 226 stores a basic input/output system (BIOS) 224 for controlling low-level operation of client computer 200. The mass memory also stores an operating system 206 for controlling the operation of client computer 200. It will be appreciated that this component may include a general-purpose operating system such as a version of UNIX, or LINUX™, or a specialized client communication operating system such as Microsoft Corporation's Windows Mobile™, Apple Corporation's iOS™, Google Corporation's Android™ or the Symbian® operating system. The operating system may include, or interface with a Java virtual machine module that enables control of hardware components and/or operating system operations via Java application programs.

Mass memory 226 further includes one or more data storage 208, which can be utilized by client computer 200 to store, among other things, applications 214 and/or other data. For example, data storage 208 may also be employed to store information that describes various capabilities of client computer 200. The information may then be provided to another computer based on any of a variety of events, including being sent as part of a header during a communication, sent upon request, or the like. Data storage 208 may also be employed to store social networking information including address books, buddy lists, aliases, user profile information, or the like. Further, data storage 208 may also store message, we page content, or any of a variety of user generated content. At least a portion of the information may also be stored on another component of client computer 200, including, but not limited to processor readable storage media 230, a disk drive or other computer readable storage devices (not shown) within client computer 200.

Processor readable storage media 230 may include volatile, nonvolatile, removable, and non-removable media implemented in any method or technology for storage of information, such as computer- or processor-readable instructions, data structures, program modules, or other data. Examples of computer readable storage media include RAM, ROM, Electrically Erasable Programmable Read-only Memory (EEPROM), flash memory or other memory technology, Compact Disc Read-only Memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computer. Processor readable storage media 230 may also be referred to herein as computer readable storage media and/or computer readable storage device.

Applications 214 may include computer executable instructions which, when executed by client computer 200, transmit, receive, and/or otherwise process network data. Network data may include, but is not limited to, messages (e.g. SMS, Multimedia Message Service (MMS), instant message (IM), email, and/or other messages), audio, video, and enable telecommunication with another user of another client computer. Applications 214 may include, for example, browser 218, and venue tracking application 220 such as customer application or venue service application as described herein. A customer application is described in more detail in FIG. 5A, and a venue service application is described in more detail in FIG. 5B. Other applications may include, but are not limited to, calendars, search programs, email clients, IM applications, SMS applications, voice over Internet Protocol (VOIP) applications, contact managers, task managers, transcoders, database programs, word processing programs, security applications, spreadsheet programs, games, search programs, and so forth.

Applications 214 may also include widget controller 210 and one or more widgets 212. Widgets 212 may be collections of content provided to the client computer by vendor server computer 112 or venue management server computer 114. Widget controller 210 may be a program that may be provided to the client computer by vendor server computer 112 or venue management server computer 114. Widget controller 210 and widgets 212 may run as native client computer applications or they may run in browser 218 as web browser based applications. Also, widget controller 210 and widgets 212 may be arranged to run as native applications or web browser applications, or combination thereof.

Figures 5A, 5B:
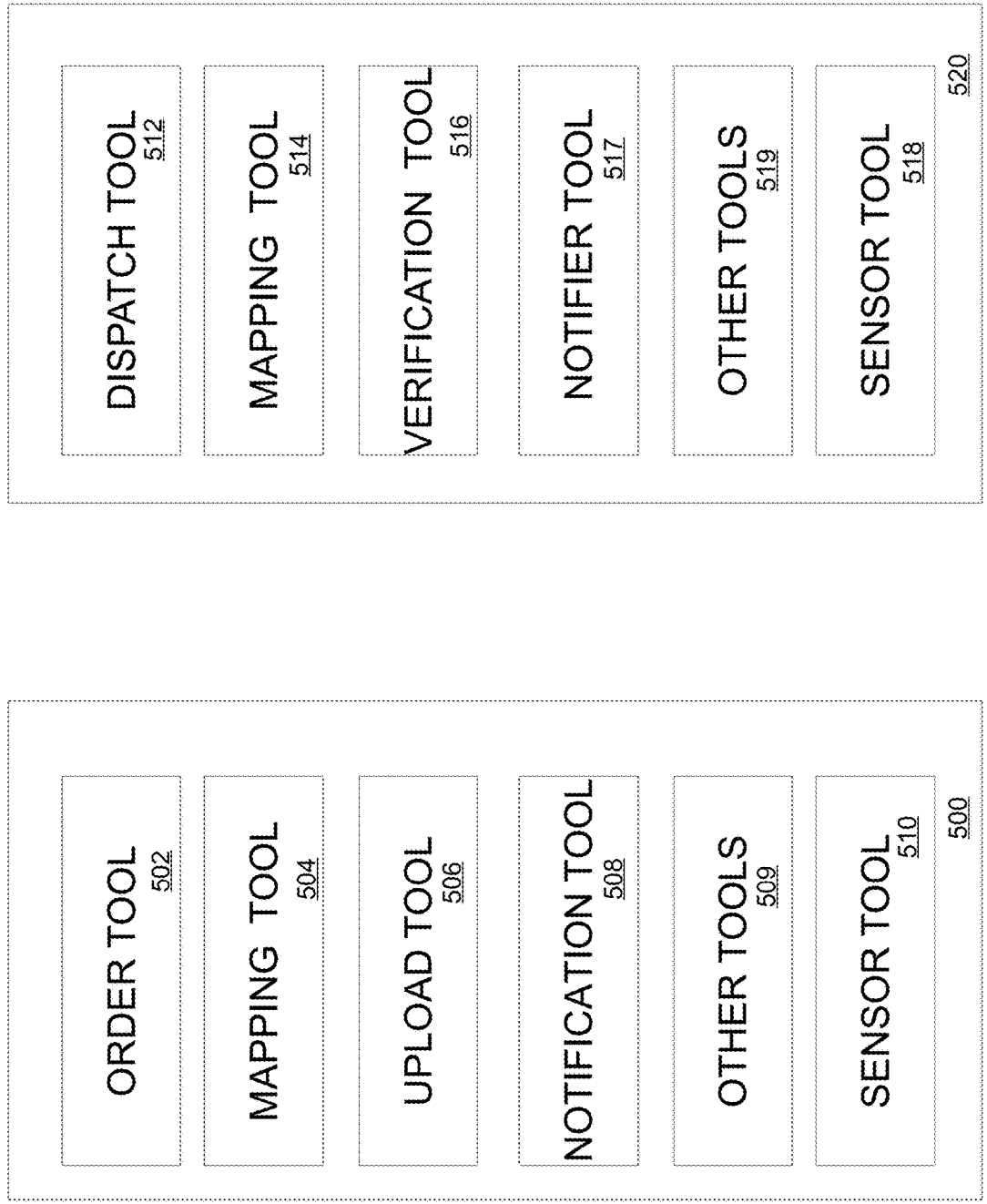
FIGS. 5A-B illustrate embodiments of client computer tracking applications for a customer and venue service staff respectively for a venue management system in accordance with at least one of the various embodiments.

FIG. 5A shows one embodiment of customer application 500 that may be included as a venue tracking application 220 in a client computer 200 for a customer and employed as described as herein. Customer application 500 may include more or less components than those shown in FIG. 5A. Customer application includes an order tool 502, a mapping tool 504, an upload tool 506, a notification tool 508, and a sensor tool 509. The customer application can include other tools 511, for example, emergency notification or staff summoning tools as described herein.

FIG. 5B shows one embodiment of venue service application 520 that may be included in a client computer 200 as a venue tracking application 220 for venue service staff and employed as described herein. Venue service application 520 may include many more or less components than those shown in FIG. 5A. Venue service application includes a dispatch tool 512, a mapping tool 514, an identity verification tool 516, a notifier tool 517, and a sensor tool 518. The customer application can include other tools 519, for example, emergency notification or staff summoning tools as described herein Illustrative Network Computer FIG. 3 shows one embodiment of a network computer 300, according to one embodiment of the invention. Network computer 300 may include many more or less components than those shown. The components shown, however, are sufficient to disclose an illustrative embodiment for practicing the invention. Network computer 300 may be configured to operate as a server, client, peer, a host, or any other computer. Network computer 300 may represent, for example vendor server computer 112, venue management server computer 114, or one or more servers of sensor system 107 in FIG. 1 and FIG. 4A, and/or other network computers.

Network computer 300 includes processor 302, processor readable storage media 328, network interface unit 330, an input/output interface 332, hard disk drive 334, video display adapter 336, and memory 326, all in communication with each other via bus 338. In some embodiments, processor 302 may include one or more central processing units.

Figure 3:
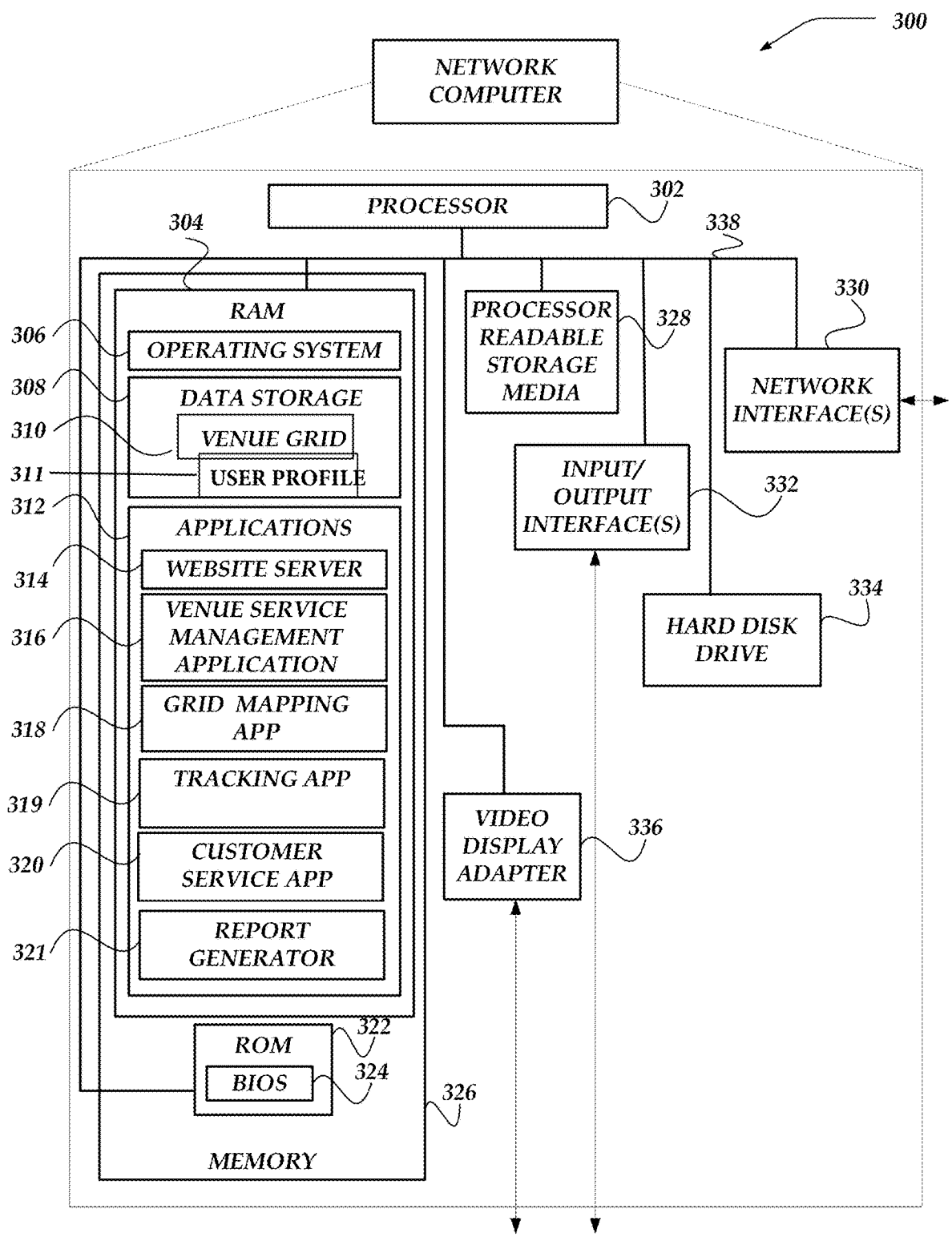
FIG. 3 shows an embodiment of a network computer that may be included in a venue management system such as that shown in FIG. 1 and FIGS. 4A-5C.

As illustrated in FIG. 3, network computer 300 also can communicate with the Internet, or some other communications network, via network interface unit 330, which is constructed for use with various communication protocols including the TCP/IP protocol. Network interface unit 330 is sometimes known as a transceiver, transceiving device, or network interface card (NIC).

Network computer 300 also comprises input/output interface 332 for communicating with external devices, such as a keyboard, or other input or output devices not shown in FIG. 3. Input/output interface 332 can utilize one or more communication technologies, such as USB, infrared, Bluetooth™, or the like.

Memory 326 generally includes RAM 304, ROM 322 and one or more permanent mass storage devices, such as hard disk drive 334, tape drive, optical drive, and/or floppy disk drive. Memory 326 stores operating system 306 for controlling the operation of network computer 300. Any general-purpose operating system may be employed. Basic input/output system (BIOS) 324 is also provided for controlling the low-level operation of network computer 300.

Although illustrated separately, memory 326 may include processor readable storage media 328. Processor readable storage media 328 may be referred to and/or include computer readable media, computer readable storage media, and/or processor readable storage device. Processor readable storage media 328 may include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computer.

Memory 326 further includes one or more data storage 308, which can be utilized by network computer 300 to store, among other things, applications 314 and/or other data such as content 310. For example, data storage 308 may also be employed to store information that describes various capabilities of network computer 300. The information may then be provided to another computer based on any of a variety of events, including being sent as part of a header during a communication, sent upon request, or the like. Data storage 308 may also be employed to store messages, web page content, or the like. At least a portion of the information may also be stored on another component of network computer 300, including, but not limited to processor readable storage media 328, hard disk drive 334, or other computer readable storage medias (not shown) within client computer 300.

Data storage 308 may include a database, text, spreadsheet, folder, file, or the like, that may be configured to maintain and store user account identifiers, user profiles, email addresses, IM addresses, and/or other network addresses; or the like. In at least one of the various embodiments, data storage 308 includes a venue grid database 310 including a grid of zones for a venue and one or more sensors associated with each zone. Data storage 308 also includes a user profile database 311 including customer data such as tickets, identification data, license data, and so on. Data storage 308 may also include an order database (not shown) for order data.

Data storage 308 may further include program code, data, algorithms, and the like, for use by a processor, such as processor 302 to execute and perform actions. In one embodiment, at least some of data store 308 might also be stored on another component of network computer 300, including, but not limited to processor-readable storage media 328, hard disk drive 334, or the like.

Applications 312 may include computer executable instructions, which may be loaded into mass memory and run on operating system 306. Examples of application programs may include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth. Applications 312 may also include website server 314, venue management application 316, grid mapping application 318, tracking application 319, order management application 320, and/or report generator 321.

Website server 314 may represents any of a variety of information and services that are configured to provide content, including messages, over a network to another computer. Thus, website server 314 can include, for example, a web server, a File Transfer Protocol (FTP) server, a database server, a content server, or the like. Website server 314 may provide the content including messages over the network using any of a variety of formats including, but not limited to WAP, HDML, WML, SGML, HTML, XML, Compact HTML (cHTML), Extensible HTML (xHTML), or the like.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims. It is therefore evident that the particular embodiments disclosed above may be altered or modified and all such variations are considered within the scope and spirit of the invention. Although illustrative embodiments of the invention have been described in detail herein, it is to be understood that the invention is not limited to those precise embodiments, and that various changes and modifications can be effected therein by one skilled in the art without departing from the scope and spirit of the invention.

CONCLUSION

While various discreet embodiments have been described throughout, the individual features of the various embodiments may be combined to form other embodiments not specifically described. The embodiments formed by combining the features of described embodiments are also within the scope of the disclosure.

What is claimed is:

1. A method for managing a venue having a plurality of physical locations, and assisting a customer within the venue, comprising:
   providing a venue management server;
   forming a virtual grid of contiguous virtual zones overlaying the venue, assigning the zones to the physical locations, and arranging one or more geo-locating sensors within each of the zones;
   creating a customer account having a unique identifier linked to the customer, in response to a ticket purchase for an event at the venue by the customer;
   associating the unique identifier of the customer with a seat location within one of the zones;
   submitting an order for goods or services using a customer device associated with the customer account, and receiving the order by the venue management server;
   providing geo-location information to the customer device while the customer is at the venue, communicating with the one or more sensors associated with each of the plurality of zones, tracking a current location of the customer within the plurality of zones based on the geo-location information from the one or more sensors and the customer identifier;
   determining the customer has arrived at the seat location by matching the current location to the seat location;
   generating one or more communications from the venue management server to a vendor to fulfill the order for goods or services, determining the current location of the customer when the order is fulfilled, and either dispatching delivery of the goods or services to the customer at a delivery location, or calculating a route through the plurality of zones from the current location of the customer to a pickup location, and providing real-time directions via the customer device directing the customer to the pickup location based on the route; setting the delivery location to the seat location of the customer;

detecting a deviation between the current location of the customer and the seat location; and the venue management server delaying dispatching delivery of the goods or services to the delivery location until the current location of the customer matches the seat location.

2. The method as described in claim 1, wherein:

the step of setting the delivery location to the seat location of the customer is followed by the step of changing the seat location of the customer to another seat location within one of the zones based on changes to the current location of the customer.

3. The method as described in claim 2, further comprising redirecting delivery of the goods or services when the one or more sensors detect that the customer has moved between zones.

4. The method as described in claim 3, wherein the step of generating one or more communications further comprises generating one or more communications from the venue management server to a vendor device operated by the vendor.

5. The method as described in claim 4, further comprising the step of displaying an indicator on the customer device when the order is fulfilled, identifying the customer to the vendor as a source of the order.

6. The method as described in claim 5, wherein:

the step of submitting an order further comprises creating a customer profile including security and identification data used for placing an order or making a purchase at the venue, and sending promotions, advertisements, announcements, instructions, or messages to the customer device based on the customer profile.

7. A method for managing a venue having a plurality of physical locations, and assisting a customer within the venue, comprising:

providing a venue management server;

forming a virtual grid of contiguous virtual zones overlaying the venue, assigning the zones to the physical locations, and arranging one or more geo-locating sensors within each of the zones;

creating a customer account having a unique identifier linked to the customer, in response to a ticket purchase for an event at the venue by the customer;

submitting an order for goods or services using a customer device associated with the customer account, and receiving the order by the venue management server;

providing geo-location information to the customer device while the customer is at the venue, communicating with the one or more sensors associated with each of the plurality of zones, tracking a current location of the customer within the plurality of zones based on the geo-location information from the one or more sensors and the customer identifier;

submitting a customer inquiry specifying one of the physical locations as a destination location via the customer device, calculating a route through the plurality of zones from the current location of the customer to the destination location, and providing real-time directions to the customer based on the route to the destination location;

generating one or more communications from the venue management server to a vendor to fulfill the order for goods or services, determining the current location of the customer when the order is ready to be fulfilled, and either dispatching delivery of the goods or services to the customer at a delivery location, or calculating a route through the plurality of zones from the current location of the customer to a pickup location, and providing real-time directions via the customer device directing the customer to the pickup location based on the route to the pickup location;

setting the delivery location to the seat location of the customer;

detecting a change in the current location of the customer away from the seat location to another of the zones; and setting the delivery location to match the current location of the customer, and redirecting the delivery of goods or services to the delivery location.

8. The method as described in claim 7, wherein:

the step of generating one or more communications further comprises determining a distance between the delivery location or the pickup location and each of a plurality of vendor locations, and fulfilling the order for goods or services from the vendor location closest to the delivery location or the pickup location.

9. The method as described in claim 8, wherein the step of generating one or more communications further comprises selecting from a plurality of venue service staff to deliver the goods or services to the customer at the delivery location, whereby the selected venue service staff is located closest to the delivery location.

10. The method as described in claim 9, wherein the step of generating one or more communications further comprises directing the customer to the pickup location, whereby the pickup location corresponds to the vendor location closest to the current location of the customer.

11. The method as described in claim 9, wherein the step of generating one or more communications further comprises generating one or more communications from the venue management server to a vendor device operated by the vendor.

12. The method as described in claim 11, further comprising the step of displaying a matching color-coded visual indicator on both the customer device and the vendor device when the order is fulfilled, identifying the customer to the vendor as a source of the order.

13. The method as described in claim 12, wherein the step of submitting an order further comprises creating a customer profile including security and identification data used for placing an order or making a purchase at the venue, and sending promotions, advertisements, announcements, instructions, or messages to the customer device based on the customer profile.

* * * * *